United States Patent [19]

Miller

[11] 3,789,966

[45] Feb. 5, 1974

[54] SELF-ADJUSTING ELECTROMAGNETIC DISC CLUTCH

[75] Inventor: Donald L. Miller, Horseheads, N.Y.

[73] Assignee: The Bendix Corporation, Southfield, Mich.

[22] Filed: Mar. 31, 1971

[21] Appl. No.: 129,740

[52] U.S. Cl. .............. 192/111 A, 188/71.8, 192/35, 192/84 A

[51] Int. Cl. .............................................. F16d 13/60

[58] Field of Search 192/84 B, 84 A, 111 A, 111 B, 192/54, 18 B, 35; 188/71.8

[56] References Cited

UNITED STATES PATENTS

| | | | |
|---|---|---|---|
| 2,623,619 | 12/1952 | Clerk | 192/35 |
| 2,692,035 | 10/1954 | Rabinow | 192/84 R |
| 2,893,528 | 7/1959 | Ryba | 192/111 A |
| 3,168,175 | 2/1965 | Straub et al. | 192/111 A |

*Primary Examiner*—Charles J. Myhre
*Assistant Examiner*—Randall Heald
*Attorney, Agent, or Firm*—William S. Thompson; Bruce A. Yungman

[57] ABSTRACT

An electromagnetic clutch with wear compensating means having two sets of co-acting friction discs adapted for releasably coupling a driving and driven rotary component. When the clutch is energized, the armature, which is not in the drive train, contactively engages with the pole faces of the electromagnet causing the freely mounted armature to rotate with the driving member; an adjusting ring which is slidably splined to the driven rotary component and advanceably threaded to the armature for relative rotation therewith, thereby applies the necessary engagement pressure to the friction disc assembly causing torque to be transmitted from the driving to the driven rotary component through the disc assembly. Any lost motion occasioned by wear of the friction discs is automatically taken up by the screw-action of the adjusting ring upon the armature; thus, the desired disc engagement pressure and the electromagnetic engaging force are held constant for the life of the clutch.

6 Claims, 2 Drawing Figures

DONALD L. MILLER
INVENTOR.

BY Bruce H. Yungman

SELF-ADJUSTING ELECTROMAGNETIC DISC CLUTCH

FIELD OF THE INVENTION

This invention relates to electrically operated friction devices and controls therefor and more particularly to an electromagnetic self-adjusting disc clutch.

BRIEF DESCRIPTION OF THE PRIOR ART

Clutches and brakes as now constructed must be taken out of operation and serviced when it is necessary to adjust the same to compensate for wear of the friction surfaces or shoes. This is expensive and troublesome. In order to avoid the need for frequent adjustment, the throw or relative movement of the main parts of the clutch or brake is sometimes made substantial. This is undesirable for mechanical reasons, and slows the operation or response of the clutch or brake. A large throw is particularly undesirable when the clutch is of the magnetic type, for a greatly increased magnetic excitation is required when a substantial spacing or throw is provided. In prior magnetic clutches at least two methods have been employed to allow for wear of the clutch facings. One is to use a very large magnetic gap so that wear does not make an appreciable difference in the gap length. The other is to let the magnetic surfaces touch each other and to let the iron wear with the friction surfaces. In the first approach, the reluctance changes with wear, which is highly undesirable since the same excitation results in different amounts of pull (and, therefore, torque). In the second method, relining is difficult, and steel is very poor friction material when used against steel. Further, when the armature is used as a torque transmitting member, the reluctance between the magnetic pole faces and the armature changes as the friction surfaces become porous and worn.

Self-adjusting clutches are well known in the art, however, in most of these devices, the adjusting occurs when the operating "throw" exceeds a predetermined value. That is, for the adjustment to take effect, the clutch or brake must be released and re-engaged. In no previous device of this type has an efficient and inexpensive automatic adjustment been provided if the machine remained continuously in the energized condition.

Some prior art designs have attempted to automatically self-adjust for wear of the frictional surfaces without requiring the clutch to release and to be re-engaged. However, these clutches, in effect, adjusted the disengaged spacing between the friction surfaces in order to compensate for wear; that is, no adjustment occurred in these devices until the main friction surfaces wore to the extent necessary to actuate the self-adjusting mechanism. Thus, by their very nature, these clutches did not maintain a constant pressure on the disc pack since the magnetic engaging force varied over the life of the clutch. As far as I have been able to determine, no clutch is known in the art that teaches a zero air gap condition from its first engagement throughout the life of the clutch so that the engagement pressures and magnetic forces are always the same.

SUMMARY OF THE PRESENT INVENTION

This invention is an electromagnetic clutch apparatus for torque transmission having input means, output means, clutch actuating means including an electromagnetic winding, an armature rotatably connected to the output means and operative to contactively engage with said input means in response to the actuating means, a friction disc assembly which includes two sets of co-acting friction discs adapted for releasably coupling the input and output means, and an adjusting ring advanceably threaded to the armature for operative engagement with said friction disc assembly. Detent means is also provided to prevent false adjustment caused by sudden stops and starts, and to maintain the adjusted position of the armature relative to the adjusting ring when the clutch is disengaged.

It is, therefore, an object of this invention to provide an improved inexpensive, efficient, self-adjusting electromagnetic friction device.

It is another object of this invention to provide a self-adjusting electromagnetic clutch in which automatic adjustment is made independently of whether the clutch is periodically released and engaged or whether it remains engaged permanently at full torque.

It is still another object of this invention to provide a self-adjusting wear compensating clutch which continuously adjusts for wear in the disc pack. Pursuant to this object, excessive wear in the disc pack is not necessary before the self-adjusting mechanism is activated since the pressure on the friction discs is kept constant throughout the life of the clutch.

It is still a further object of this invention to provide an electromagnetic clutch which minimizes the reluctance in the flux path linkage by providing an armature which is not the principal torque carrying member and which is not in the drive train. That is, the flat smooth contactive relationship between the armature and the electromagnet's pole faces is maintained throughout the life of the clutch. Thus, a strong magnetic engaging force is guaranteed regardless of the wear exhibited by the friction discs.

Another object of this invention is to provide an electromagnetic clutch in which the electromagnetic engaging force is unaffected by wearing of the torque carrying members, since the flux does not pass through the torque transmitting surfaces.

Still a further object of this invention is the provision of a unique and simplified wear adjusting means to automatically maintain the clutch armature in close contactive engagement with the electromagnet's pole faces, regardless of the wear experienced by the torque transmitting members.

It is another object of this invention to provide an efficient electromagnetic clutch with a new economical wear compensating means.

It is even a further object of this invention to provide an electromagnetic clutch having high torque load capacity in a clutch housing of substantially small diameter.

It is another important object of this invention to provide a multiple disc clutch with automatic wear compensating means in which it is unnecessary to ever adjust the air gap between the armature and pole face since it is always maintained at or near to zero. By satisfying the requirements dictated by this object, the self-adjusting feature of this invention more than doubles the dynamic and static torque of a clutch of similar design without the self-adjusting wear compensating feature.

It is yet a further object of this invention to provide an improved self-adjusting clutch in which the disengaged spacing between armature and electromagnet pole face is held constant in order to provide a constant actuating magnetic engaging force regardless of wear experienced by the friction discs.

Other objects and advantages of this invention will become apparent from the following detailed description taken in conjunction with the accompanying drawings.

DETAILED DESCRIPTION OF THE PREFERRED EMBODIMENT

Figure 1:
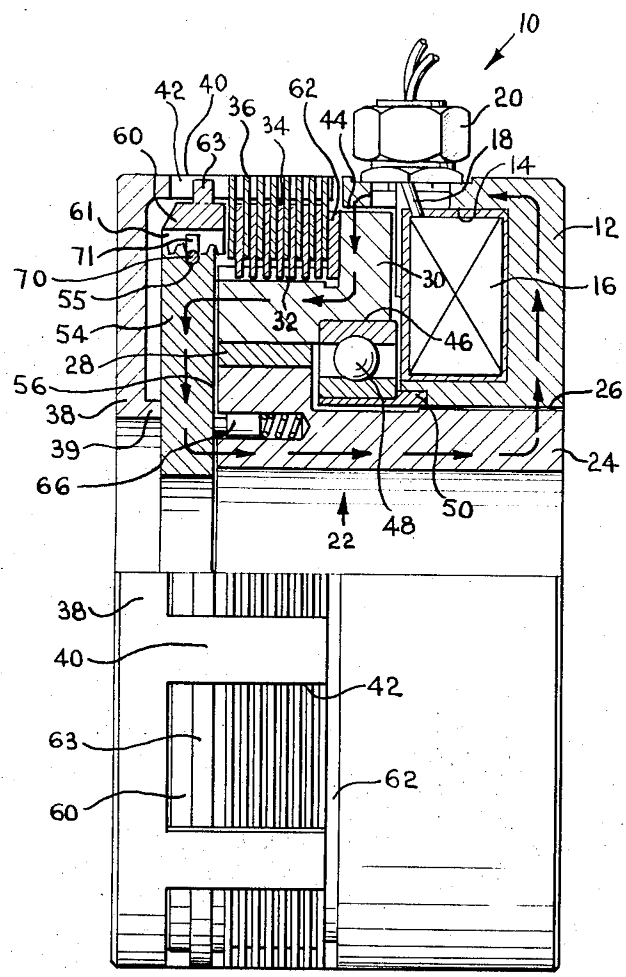
FIG. 1 is a schematic partial cross-sectional view of my electromagnetic clutch design.

Referring to FIG. 1, my electromagnetic clutch is shown generally designated by numeral 10. The clutch includes a fixed or stationary magnet body 12 adapted to be secured to fixed mounting structure (not shown) and fabricated of magnetic flux-conducting material such as iron or steel. Magnet body 12 is formed to provide an annular recess or cavity 14 within which is mounted an electromagnetic coil 16 which may be secured in the cavity by resin or other conventional means. Coil 16 has leads 18 extending radially upwardly as viewed in the drawings where they may be connected to a controlled power source or control circuit (not shown) through the connector 20.

The clutch of the present invention is reversible with respect to input and output sides and thus, clutch structure which in one installation would be an input member, in another installation would be an output member. Accordingly, rotating input and output members referred to in the following description as driving and driven means respectively, could also have been referred to generically as first and second torque transmitting members. However, for reasons of clarity in description, the generic terminology was avoided.

My clutch further includes a rotary driving member 22 which consists of three integral subparts. First, a generally-cylindrical member 24 defines the radially inner confine of the clutch and which extends axially so that one end is concentric with the magnet body 12, but having a small but definite radial air gap 26 therebetween. Cylindrical member 24 is fabricated of magnetic flux conducting material. An annular ring 28 of nonconducting magnetic flux material such as brass or the like forms a second subpart of the driving means 22 and is integrally secured to cylindrical member 24. A third and radially outermost annular member 30 is comprised of magnetic flux conducting material and is integrally secured to the ring 28 so that the driving means 22 is a laminated member having radially inner and outer magnetic flux conducting portions and an intermediate nonflux conducting section. It will be apparent that magnetic flux is inhibited from traveling radially through the driving member 22, but may travel in a general axial direction through both the inner cylindrical member 24 and the outer annular member 30.

The driving or input member 22 has axially extending splines 32 formed along one portion of its outer surface on which are slidably mounted a first plurality of annular friction discs 34. It will be readily understood that the spline connection fixes the first plurality of discs to the driving member rotationally while permitting relative axial movement. A second plurality of friction discs 36 are alternately disposed between adjacent discs 34 to comprise a friction clutch disc pack. Discs 36 are connected to the output or driven member 38 which has an axially extending portion 40 having slots 42 providing an axially-slidable but rotationally fixed connection with the discs 36.

The annular member 30 extends axially to the right as viewed in the drawing of the friction disc pack, forming a reaction plate on one side of the disc pack and providing a second radial air gap 44 with the magnet body 12. The inner radial edge of annular ring 30 has a groove 46 forming a seat for the outer race of bearing 48 which, in turn, is supported at its inner race by sleeve 50 which is brazed or otherwise secured to magnet body 12.

The three laminated sections of the driving member 22 may be integrally secured in various conventional ways such as for example, drilling and tapping an oversize screw hole that overlaps all three sections and inserting a screw (not shown). While a screw, if steel, would permit a small flux leakage from radially inner to radially outer segments, a certain limited amount of flux leakage can be tolerated, depending on coil and current strength and the flux gap spacing. Moreover, the nonconducting ring need not necessarily be annularly continuous, but may be comprised of a series of annularly-arranged segments interspersed with thin ribs interconnecting the radially inner and outer members just so long as adequate and operative flux strength is maintained in an axial direction.

An annular armature plate 54 is fabricated from magnetic flux conducting material and is arranged a small spaced distance from one side face of the driving member 22, providing an axial air gap 56 and extends radially to overlap all three laminated segments. The radially outer surface of armature 54 is threaded entirely therealong and has a groove 55 formed therein.

At the radial outermost edge of armature plate 54, there is threadably mounted an annular adjusting ring 60. The helical thread or spline which mates adjusting ring 60 to armature 54 is such that armature 54 may rotate relative to adjusting ring 60 (whenever the armature is engaged) thereby imparting a vector component which tends to force ring 60 axially to the right as viewed in the drawing. Adjusting ring 60 extends axially to the right (in the drawing) of armature 54, forming a pressure plate for bearing against the disc pack. Adjusting ring 60 has a plurality of radially extending tanges 63 which are received in slots 42 provided in the radially extending section 40 of output member 38; this connection permits ring 60 to slide axially along member 38 and simultaneously secures ring 60 to output member 38 for rotation therewith.

The adjusting ring 60 has an axially extending slot 61 for engaging an upwardly extending tange 71 of a drag ring 70. Drag ring 70 forms one discontinuous loop or turn and is sprung into groove 55 of armature 54. Drag ring 70, which may be referred to as detent means 70, is so arranged that when armature 54 is rotating more rapidly than the adjusting ring 60, ring 70 will loosely slide in its groove 55. When, on the other hand, armature 54 tends to rotate at a slower speed than adjusting ring 60, ring 70 grips armature 54 by closing upon it more tightly because of the cooperation between tange 71 and the adjusting ring slot 61. [A description and illustration of a retarding ring similar to drag ring 70 can be found in commonly assigned U.S. Pat. No. 3,300,006.] Thus, the detent means 70 prevents the armature from reversing its direction of rotation relative to the adjusting ring when the armature is disengaged, while simultaneously it allows the adjusting ring to rotatably advance on the armature (in the same direction of rotation as the driving means) to compensate for any wear that may occur in the disc pack; the "adjusted" position of the armature relative to the adjusting ring is therefore always maintained.

The adjusting ring 60 and annular spacer or pressure plate 62 at the opposed side of the disc pack are preferably fabricated of nonmagnetic material in installations where the discs 34 and 36 are flux-conducting metal elements to block flux leakage through the disc pack.

Spring loaded plunger 66 is set in a drilled passage in the driving means 22 and abuts armature plate 54 for applying a retraction force tending to bias the armature plate 54 against a shoulder 39 which protrudes axially inwardly from the output member 38. Member 39 can also be a magnetically nonconducting annular ring which can be brazed to output member 38 thus preventing any possible flux loss. With this retracting or clutch disengaging arrangement, the disengaged air gap between armature 54 and driving means 22 is held constant throughout the life of the clutch. Thus, the magnetic engaging force initially required to draw armature 54 into contactive engagement with the driving means 22 is always the same.

Since the engaging force remains constant, and since adjusting member 60 compensates for any wear that occurs within the disc pack, the variances between static and dynamic torques developed by the clutch are practically unchanged throughout the life of the clutch. Extensive testing has proved remarkable clutch integrity and reliability. Further, the same tests have demonstrated that with the self-adjusting mechanism shown and described in this clutch, both static and dynamic torques have more than doubled over a clutch of similar design without the self-adjusting feature.

Figure 2:
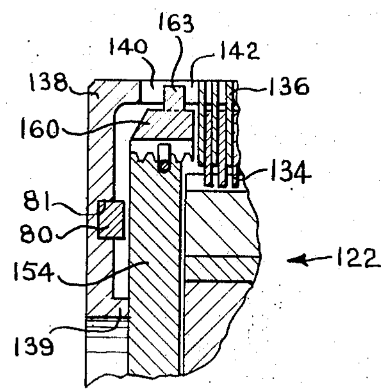
FIG. 2 is a break-away view of an alternate embodiment of my invention showing a new and novel clutch releasing means.

Referring to FIG. 2 an alternate embodiment of the present invention is shown. Similar parts are preceded by the numeral 1. In this embodiment, a permanent magnet body 80 is suitably secured within a cavity 81 provided in the output member 138. When the clutch is de-energized, the magnet body 80 attracts the armature 154 and thereby withdraws it from the driving means 122 and pulls it into contactive engagement with shoulder 139. The magnet body 80 may be bonded to output member 138, or be secured by other suitable means. Member 80 may be an annular ring disposed within an annular cavity 81 in output member 138, or member 80 may be a plurality of smaller magnetic bodies suitably connected to output member 138.

Since the friction developed between armature 54 and plunger 66 of the preferred embodiment has a minor rotational dragging effect on the armature, the magnetic release shown in FIG. 2 can be used where extremely finite self-adjusting control is desired.

OPERATION OF THE PREFERRED EMBODIMENT

The clutch, as illustrated in the drawings, is shown in the disengaged position whereby the driving and driven rotary members are frictionally uncoupled. When the clutch is desired to be engaged, electrical power is supplied through leads 18 to coil 16 which generates an electromagnetic field following the path illustrated by arrows in the drawing. This flux travels in a loop through the magnet body 12, jumping the radial air gap 44, axially through the outer annular member 30 (thus reaching past the disc pack), jumping the axial air gap 56 to armature 54. From thence the flux travels radially inwardly of the armature plate where it again jumps the axial air gap 56, passing through cylindrical member 24, the radial air gap 26, back to the magnetic body.

The magnetic flux exerts a pull across the axial air gap 56, pulling the armature plate 54 into contactive engagement with the driving means 22 (which is assumed to be rotating) causing the armature-adjusting ring assembly to rotate with the driving means 22. However, since the output member 38 exerts a relatively substantial rotational load on adjusting ring 60 through the tanges 63, ring 60 is caused to coact with the relatively slower rotating output member and the mating helical threads of the relatively rapidly rotating armature; this, in turn, causes ring 60 to be driven to the right as viewed in the drawings thereby compressing the disc pack for clutch engagement. When the circuit to coil 16 is interrupted, the flux decays, permitting spring loaded plunger 66 to push the armature plate 54 against shoulder 39, thus releasing the disc pack and permitting relative motion between driving and driven members. The "adjusted" position of the armature relative to the ajusting ring is held by the detent means 70. The operation is essentially the same for the alternative embodiment of this invention, however, when the circuit to coil 16 is interrupted in the alternative embodiment, it is the magnet body 80 which retracts the armature plate against shoulder 139 rather than the spring loaded plunger 66.

In the engaged position, armature 54 remains in close contactive engagement with the driving means 22 and no air gap between these members is allowed to develop. Simultaneously, almost all torque transferred between the driving means and the driven means is carried by the disc pack.

No further relative movement by adjusting ring 60 upon the screw threaded surface of armature 54 will take place until the frictional surfaces of the friction discs become worn. Any lost motion occasioned by the wearing away of the frictional surfaces of the friction discs will be at once taken up by the co-action of adjusting ring 60 with the output member 38 and the screw threaded outer surface of armature 54 as described above.

While only the preferred embodiment and one alternative embodiment of the invention have been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic clutch of the type having a friction disc assembly, which assembly includes two sets of co-acting friction discs adapted for releasably coupling a driving and a driven rotary component, and wherein pressure is exerted on said disc assembly by an armature's response to a magnetic force created by electromagnetic actuating means, the improvement comprising:

self-adjusting wear compensating means, said compensating means including an adjusting ring advanceably and concentrically threaded to said armature for relative rotation therewith, said ring being slidably adapted for axial movement along said driven rotary component for contactive engagement with said friction disc assembly, and said ring being secured to said driven rotary component for rotation therewith so that upon energization of said actuating means said armature is drawn into contactive engagement with said driving rotary component which in turn causes said adjusting ring to coact with said driven rotary component and its threaded connection with said armature, thereby axially advancing said adjusting ring into contactive engagement with said friction disc assembly.

2. The combination as claimed in claim 1 including further detent means for retarding said armature from rotatably reversing its direction of rotation relative to said adjusting ring.

3. The combination as claimed in claim 1 wherein the electromagnetic actuating means comprises a magnet body disposed about said driving means and an electromagnetic winding disposed within said magnet body.

4. The combination as claimed in claim 1 including further, clutch disengagement means, said disengagement means including a spring loaded plunger adapted to exert an axial load on the armature opposite in direction to the electromagnetic engaging force.

5. The combination as claimed in claim 1 including further, clutch disengagement means, said disengagement means comprising magnetic means positioned in a plane parallel to said armature and adapted to exert a magnetic force on said armature opposite in direction to the electromagnetic engaging force.

6. The combination as claimed in claim 1 including further armature spacing means for providing a constant air gap between said armature and said driving rotary component when the clutch is in a disengaged position.

* * * * *